United States Patent [19]

Whitehead et al.

[11] Patent Number: 5,013,136
[45] Date of Patent: May 7, 1991

[54] METHOD AND APPARATUS FOR ANAMORPHICALLY SHAPING AND ACHROMATICALLY DEFLECTING ELECTROMAGNETIC BEAMS

[75] Inventors: Frank R. Whitehead, Orangevale; Ingolf Sander, Cupertino, both of Calif.

[73] Assignee: Eastman Kodak Company, Rochester, N.Y.

[21] Appl. No.: 461,877

[22] Filed: Jan. 8, 1990

Related U.S. Application Data

[63] Continuation-in-part of Ser. No. 292,720, May 25, 1990, Pat. No. 4,929,067.

[51] Int. Cl.$^5$ .............................................. G02B 5/04
[52] U.S. Cl. ..................................... 350/286; 350/421
[58] Field of Search ......................... 350/286, 421, 320

[56] References Cited

U.S. PATENT DOCUMENTS

| | | | |
|---|---|---|---|
| 3,541,919 | 11/1970 | Weyrauch | 350/286 |
| 4,623,225 | 11/1986 | Forkner | 350/286 |
| 4,627,690 | 12/1986 | Fantone | 350/286 |
| 4,759,616 | 7/1988 | Marchant | 350/286 |
| 4,929,067 | 5/1990 | Sander | 350/286 |
| 4,930,878 | 6/1990 | Bergner et al. | 350/286 |

FOREIGN PATENT DOCUMENTS

| | | | |
|---|---|---|---|
| 113651 | 5/1899 | Fed. Rep. of Germany | 350/286 |
| 18256 | 12/1913 | United Kingdom | 350/286 |

*Primary Examiner*—Jon W. Henry
*Attorney, Agent, or Firm*—Warren W. Kurz

[57] ABSTRACT

A method and apparatus for anamorphically shaping a beam of radiation and for deflecting such beam by 90° independently of beam wavelength shifts within a predetermined wavelength range. The apparatus of the invention comprises an achromatic prism comprising a pair of prism elements of different optical materials. The prism elements are joined together to define a complex prism having four faces which interact with an incident beam to achieve a desired beam shaping and deflection. Two of such faces are parallel, one face being in a plane parallel to the direction of propagation of an incident beam, and the other being in a plane perpendicular to the beam exiting the prism.

7 Claims, 2 Drawing Sheets

METHOD AND APPARATUS FOR ANAMORPHICALLY SHAPING AND ACHROMATICALLY DEFLECTING ELECTROMAGNETIC BEAMS

BACKGROUND OF THE INVENTION

This invention relates to methods and apparatus for anamorphically shaping and deflecting beams of electromagnetic radiation, for example, a radiation beam produced by a diode laser. More particularly, it relates to a method and apparatus for achromatically deflecting a beam by precisely 90° while anamorphically altering its intensity profile.

The advent of the diode laser has greatly expanded the need to handle laser beams of elliptical cross section. Because these lasers have very asymmetric active regions, they may exhibit beam divergence ratios in the 1:2-1:4 range. When the beam is collimated by a collector lens, it retains its ellipticity. The beam ellipticity, in turn, affects (usually reduces) the efficiency with which the beam can be focused through a circular objective lens.

Heretofore, it has been common to use a Littrow-type prism (i.e., a three sided right angle prism) for anamorphically expanding an elliptical beam to make it more circular. The output of a diode laser is predominantly polarized in the TE state, and the collimated beam is polarized parallel to its minor axis. If, as shown in FIG. 1, the beam B is incident at the Brewster angle $\Theta_B$, on the hypotenuse face of a Littrow prism in which one of the acute angles is cut at the Brewster angle, it will be anamorphically expanded by a factor n in a direction of the minor axis, where n is the refractive index of the prism. While this is a good approach for reducing the ellipticity of a diode laser beam, it is disadvantageous from the standpoint that the beam is deflected by an inconvenient angle $\alpha$, where $\alpha = 2\Theta_B - 90°$. For ordinary glass prisms, $\alpha$ is between 20° and 30°. For many applications, it is desirable that the expanded beam be either parallel to, if not co linear with, the incoming beam or, alternatively, be deflected during the expansion by some convenient angle, for example, 90°. Moreover, it is highly desirable that the deflection angle be independent of changes in wavelength of the incoming beam. In the case of diode lasers, for example, shifts in wavelength of 20-30 nm are common in responses to ambient temperature changes, variations in the applied voltage, and optical feedback noise.

In U.S. Pat. No. 4,759,616 issued in the name of A. B. Marchant, there is disclosed a method for anamorphically shaping a beam of radiation and for deflecting such beam by precisely 90°. This method also makes use of a Littrow type prism (or a truncated version of such prism) but, unlike the optical arrangement described above with reference to FIG. 1, the prism is arranged in the beam path so that the beam enters the prism face opposite the $\Theta_B$ angle at (or near) the Brewster angle. Referring to FIG. 2, upon entering the prism, the refracted beam is reflected by that prism face opposite the $(90° - \Theta_B)$ angle and emerges from the prism through the hypotenuse face at 90°. While this beam-shaping and deflecting technique has the advantage of deflecting the beam through a convenient angle, the prism employed can be difficult to optically align with the laser source and other optical elements which operate on the beam as it enters and exits the prism. Moreover, the prism is not achromatic and, hence, the deflecting angle is still wavelength-dependent.

SUMMARY OF THE INVENTION

An obJect of this invention is to provide a more readily alignable prism of the above type, as well as one which is achromatized so as to be independent of beam wavelength changes over a predetermined wavelength range.

The achromatic beam shaping and 90° deflecting prims of the invention comprises a pair of prism elements made of different optical materials. The prism elements are optically Joined together to define a complex prism having four faces which interact with an incident beam to achieve a desired beam-shaping and deflection. Two of such faces are parallel, one face being arranged parallel to the intended direction of an incident beam of radiation, and the other being perpendicular to the beam exiting the prism. The optical materials are chosen to minimize variations in the deflection angle as a result of wavelength shifts of the incident beam.

The invention and its advantages will become more apparent to those skilled in the art from the ensuing detailed description of the preferred embodiments, reference being made to the accompanying drawings.

DETAILED DESCRIPTION OF PREFERRED EMBODIMENTS

Figure 1:
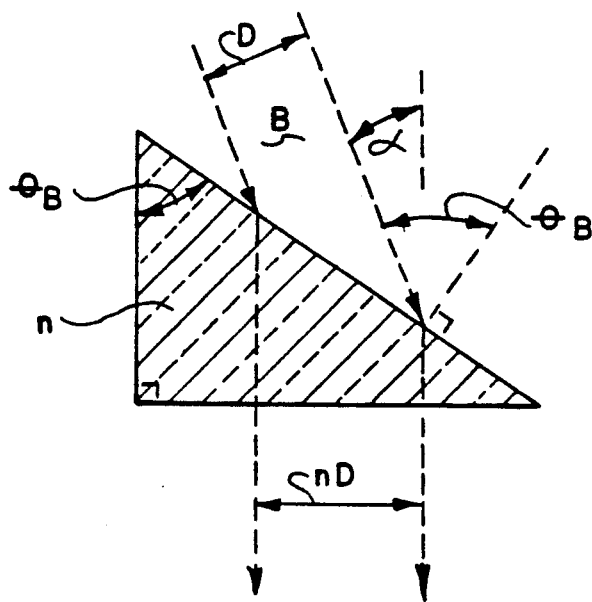
FIGS. 1 and 2 illustrate anamorphic beam expansion and deflection schemes as practiced by the prior art.
Figure 2:
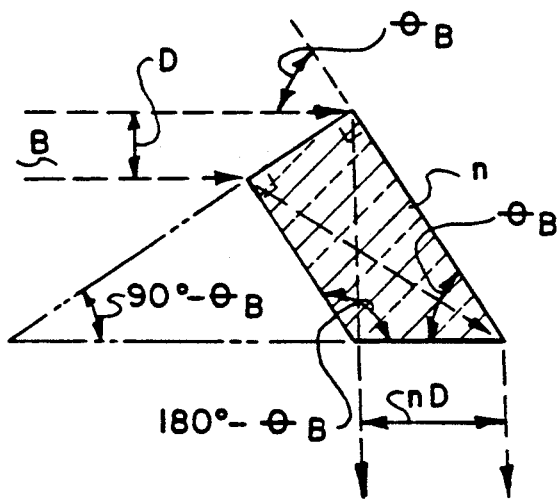
Figure 3:
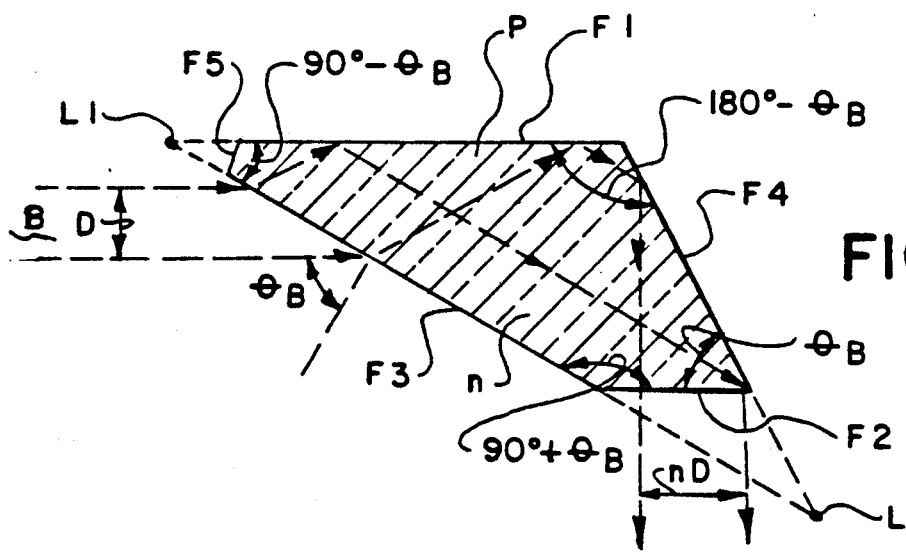
FIG. 3 illustrates the anamorphic beam expansion and deflection concept which is useful for monochromatic radiation.

Referring to FIG. 3, the prism P is illustrated as being five sided, comprising five lateral faces, F1-F5. As will be apparent, face F5 is non-essential and results only from truncating, for the sake of compactness, the converging faces F1-F3 short of their line of convergence L1, perpendicular to drawing plane. Faces F1 and F2 are parallel, and the respective planes of faces F3 and F4 converge toward a line L2. The respective planes of prism faces F1-F4 define four internal angles, $\Theta_B$, $90° + \Theta_B$, $90° - \Theta_B$, and $180° - \Theta_B$, where $\Theta_B$ is the Brewster angle defined by $\tan^{-1} n$, where n is the refractive index of the prism material. When the refractive index of the prism is about 1.7, which is relatively common for ordinary glass, $\Theta_B$ is about 60°. Thus, for an ordinary glass prism having a refractive index of 1.7, the above mentioned internal angles are 60°, 150°, 30° and 120°.

In use, prism P is positioned in the optical path of a beam B of electromagnetic radiation so that the beam is incident on face F3 at the Brewster angle $\Theta_B$. Assuming that the beam is plane polarized, as is the output of a diode laser, and that the plane of polarization is parallel to the plane of incidence, beam B will be refracted at the prism/air interface with little or no light loss. The refracted beam then undergoes double internal reflection, being totally reflected by prism faces F1 and F4, and emerges from the prism through and perpendicular to prism face F2. It will be noted that the output beam is deflected 90° with respect to the input beam, and the beam diameter D will undergo an expansion by a factor of n, the refractive index of the prism material. There is, of course, no expansion of the beam profile in a direction perpendicular to the drawing.

Figure 4:
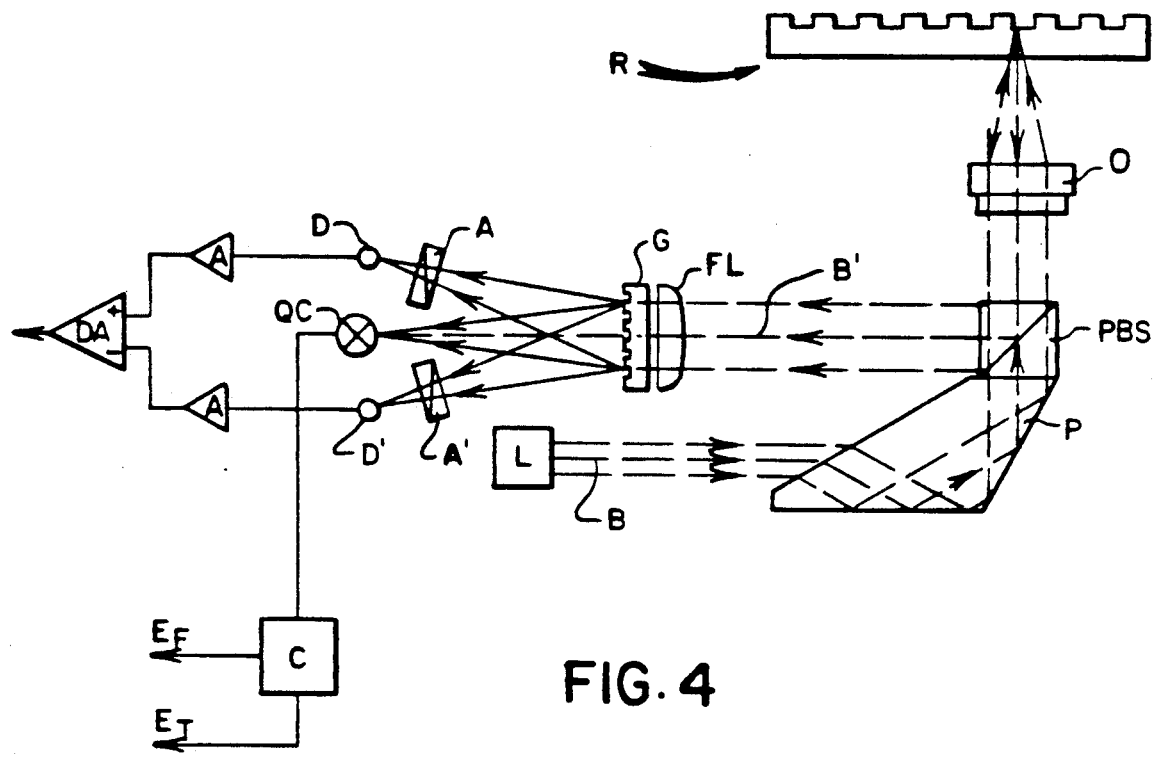
FIG. 4 is a schematic illustration of a magneto-optic recording system embodying the FIG. 3 apparatus.

In FIG. 4, prism P is shown as embodied in a magneto-optic recording system. Such a system comprises a laser source L for producing a plane-polarized beam B of radiation. As mentioned above, the intensity profile of such a beam is usually elliptical and it is desired to circularize this profile by expanding it in the direction of the minor axis. Such anamorphic expansion is achieved by prism P which, as already explained, also serves to deflect the beam by 90°. While the prism disclosed in the aforementioned U.S. Pat. No. 4,579,616 will achieve the anamorphic shaping and deflection functions of the prism of this invention, the unique arrangement of the faces of the prism of the invention and its position in the beam path allow one face (face F1), which is the surface of first reflection, to be positioned parallel with the axis of the laser beam B. This greatly simplifies the optical assembly and alignment of the magneto-optic head. The beam emerging from prism face F2 then passes through a polarizing beam-splitter PBS and is brought to focus on a magneto-optic recording element R by an objective lens O. Depending on the state of magnetization of the magnetic domains along the data tracks T, the plane of polarization of beam B is slightly rotated by the well known Kerr effect. The beam reflected from the recording element is then deflected by the beam-splitter through an astigmatizing field lens assembly FL. A diffraction grating G serves to diffract the beam into zeroth and ± first order beams. A conventional quad-cell detector is used to detect the focus and tracking accuracy from the zeroth order beam, the output of the quad-cell being processed by circuit C to produce focus and tracking error signals $E_F$ and $F_T$, respectively. The recorded data is detected differentially by passing the ± first order diffracted beams through a pair of polarization analyzers A, A', whose respective polarization axes are offset by 90°. The respective outputs of photo detectors D and D' are then processed by an amplifiers A and subtracted by a differential amplifier DA to provide a data signal RF. This magneto-optic system is more thoroughly described in the copending U.S. patent application Ser. No. 234,767 filed Aug. 22, 1988, in the names of Ingolf Sander and Alan Marchant.

In the above mentioned magneto optic recording system a prism having a refractive index of 1.71 was employed. The approximate lengths of the prism faces were: F1=14 mm, F2-5.5 mm, F3=16 mm, F4=10 mm and F5=1.5 mm. The angle of incidence was 60.9°, i.e. approximately the Brewster angle.

Figure 5:
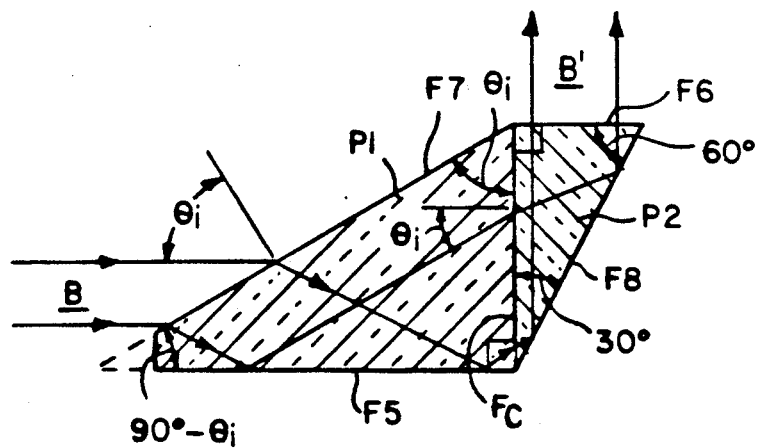
FIG. 5 illustrates an achromatic complex prism structured in accordance with a preferred embodiment of the invention.

FIG. 5 illustrates an achromatized version of the prism shown and described with reference to FIGS. 3 and 4. The achromatized prism comprises a pair of prism elements P1 and P2 made of different optical materials, i.e. materials of different refractive indices and dispersive powers. The respective materials of the prism elements are chosen so that the deflection angle (90°) is independent of the wavelength of the incident beam, over some reasonable wavelength range (e.g. 730-810 nanometers). Generally, prism element P1 comprises a material (e.g. glass) having a relatively low dispersion, whereas prism element P2 comprises a material of relatively high dispersion. According to the preferred embodiment shown, each of the prism elements has an internal prism angle of 90°. Prism element P1 has further internal angles of $\Theta_i$ and $90°-\Theta_i$ where $\Theta_i$ is a desired angle of incidence. Prism element P2 has further internal angle of 60° and 30°. The prism elements are joined (e.g. adhesively bonded) together along a common face $F_c$ to form a complex prism having four faces, F5-F8, which interact with an incident beam to shape and deflect such beam by 90°. The respective angles of incidence $\Theta_i$ and $\Theta_i'$ of the beam on faces F7 and $F_c$ are chosen so that the total refraction at the respective surfaces is substantially constant over the achromatic wavelength range. The achromatic design adds the advantage that wavelength changes of the diode laser source in FIG. 4 do not produce a shift in the focus spot position on the recording element.

A particularly preferred material for prism element P1 is LAKN22 glass, having a refractive index of 1.64 at 780 nm and an Abbe member of 913 over the wavelength range of 765-790 nm. When prism element P1 comprises such a glass, a preferred material for prism element P2 is SF11 glass having a refractive index of 1.77 at 780 nm, and an Abbe number of 489. Using such glasses and an angle of incidence of about 66.4°, the deflected beam B' was found to exhibit substantially no change in position over the wavelength range of 765-795 nm.

The invention has been described in detail with particular reference to certain preferred embodiments thereof, but it will be understood that variations and modifications can be effected within the spirit and scope of the invention.

We claim:

1. A method for anamorphically shaping a beam of polychromatic radiation of two different wavelengths and for achromatically deflecting such beam by 90°, said method comprising the steps of:

(a) providing an achromatic prism comprising first and second prism elements made of optical materials having different indices of refraction and dispersive powers, each of said prism elements having a plurality of faces, said prism elements being joined together to share a common face and thereby define a complex prism having four faces which interact with an incident beam to provide a desired anamorphic shaping and 90° deflection of such beam, two of said four faces being parallel and the other two faces being non-parallel; said optical materials being chosen so that the 90° deflection of such beam is substantially independent of said two different wavelengths; and (b) arranging said complex prism in such beam so that the beam enters the prism through one of said non-parallel faces from a direction parallel to said parallel faces and perpendicular to said common face, said faces being arranged with respect to each other so that the beam, upon entering the prism, is refracted toward one of said parallel faces, undergoes double internal reflection, first from said one of said parallel faces and then from the other of said non-parallel faces, and emerges from said prism through and perpendicular to the other of said parallel faces.

2. An achromatic prism for anamorphically shaping an incident beam of polychromatic radiation of two different wavelengths and for achromatically deflecting such beam by 90°; said prism comprising first and second prism elements made of optical materials having different refractive indices and dispersive powers, each of said prism elements having at least three faces, two of said three faces in each prism element being arranged at a 90° angle, said prism elements being joined together to share a common face, and thereby define a complex prism having four faces which interact with an incident beam entering said complex prism in a direction perpendicular to said common face to provide a desired anamorphic shaping and 90° achromatic deflection of such beam, two of said four faces being parallel and the other two faces being non-parallel, one of said non-parallel faces forming internal prism angles of 90°-$\Theta_i$ with one of said parallel faces, where $\Theta_i$ is a desired angle of incidence of a beam of radiation with said one of said non-parallel faces, and the other of said non-parallel faces forming an internal prism angle of approximately 60° with the other of said parallel faces, said optical materials and said angle $\Theta_i$ being chosen so that the 90° deflection of said beam is substantially independent of said two different wavelengths.

3. The apparatus as defined by claim 2 wherein one of said prism elements has internal angles of approximately 30°, 60° and 90°, and the other of said prism elements has internal angles of $\Theta_i$, 90°-$\Theta_i$, and 90°.

4. The apparatus as defined by claim 2 wherein those faces of the prism elements opposite the 60° and 90°-$\Theta_i$ angles are the faces joined together to provide said common face.

5. An achromatic prims for anamorphically shaping a beam of radiation and deflecting such beam by 90°, said prism comprising first and second prism elements made of optical materials of different refractive indices and dispersive powers, each of said prism elements having a plurality of faces, said prism elements being joined together to share a common face and to define a complex prism having four faces, three of said four faces collectively interacting with an incident beam to provide, by means of refraction and double internal reflection, a desired anamorphic shaping and 90° deflection of such beam, such beam exiting the prism in a direction perpendicular to the fourth of said four faces.

6. The apparatus as defined by claim 4 wherein one of said prism elements has internal angles of approximately 30°, 60° and 90°, and the other of said prism elements has internal angles of $\Theta_i$, 90°-$\Theta_i$, and 90°, where $\Theta_i$ is a desired angle of incidence of a beam of radiation with one of said three faces.

7. The apparatus as defined by claim 6 wherein those faces of the prism elements opposite the 60° and 90°-$\Theta_i$ angles are the faces joined together to provide said common face.

* * * * *